United States Patent
Denichou et al.

(10) Patent No.: US 7,751,280 B2
(45) Date of Patent: Jul. 6, 2010

(54) DETERMINING WELLBORE POSITION WITHIN SUBSURFACE EARTH STRUCTURES AND UPDATING MODELS OF SUCH STRUCTURES USING AZIMUTHAL FORMATION MEASUREMENTS

(75) Inventors: Jean-Michel Denichou, Houston, TX (US); Soazig Leveque, Stavanger (NO)

(73) Assignee: Schlumberger Technology Corporation, Sugar Land, TX (US)

(*) Notice: Subject to any disclaimer, the term of this patent is extended or adjusted under 35 U.S.C. 154(b) by 306 days.

(21) Appl. No.: 11/691,998

(22) Filed: Mar. 27, 2007

(65) Prior Publication Data
US 2008/0236270 A1 Oct. 2, 2008

(51) Int. Cl.
*G01V 1/44* (2006.01)
(52) U.S. Cl. .......................... 367/73; 702/11
(58) Field of Classification Search ................. 367/73, 367/25; 702/7, 11, 6
See application file for complete search history.

(56) References Cited

U.S. PATENT DOCUMENTS

| | | | |
|---|---|---|---|
| 5,235,285 A | 8/1993 | Clark et al. | |
| 5,517,464 A | 5/1996 | Masak et al. | |
| 5,555,220 A | 9/1996 | Minto | |
| 5,870,690 A | 2/1999 | Frenkel et al. | |
| 6,594,584 B1 | 7/2003 | Omeragic et al. | |
| 7,017,667 B2 | 3/2006 | Hall et al. | |
| 7,035,165 B2 | 4/2006 | Tang et al. | |
| 7,209,834 B2* | 4/2007 | El Askary | 702/7 |
| 7,359,845 B2 | 4/2008 | Kelfoun | |
| 7,403,857 B2 | 7/2008 | Haugland | |
| 2003/0085707 A1 | 5/2003 | Minerbo et al. | |
| 2003/0184299 A1 | 10/2003 | Strack | |
| 2005/0041526 A1 | 2/2005 | Esmersoy et al. | |
| 2005/0140373 A1 | 6/2005 | Li et al. | |
| 2006/0157277 A1 | 7/2006 | Bittar et al. | |
| 2006/0195264 A1 | 8/2006 | El Askary | |
| 2008/0109167 A1 | 5/2008 | Wang et al. | |

* cited by examiner

*Primary Examiner*—Ian J Lobo
(74) *Attorney, Agent, or Firm*—David J. Smith; Dave R. Hofman (57) ABSTRACT

A method for determining structure in the Earth's subsurface includes generating an initial model of the structure. The initial model includes at least one layer boundary. A wellbore is drilled along a selected trajectory through the Earth's subsurface in a volume represented by the initial model. At least one formation parameter is measured azimuthally along the wellbore. A distance is determined from the wellbore at selected positions therealong to the at least one layer boundary using the azimuthal formation parameter measurements. The initial model is adjusted using the determined distances. In one example, the parameter is resistivity. In one example, the parameter is acoustic velocity.

20 Claims, 4 Drawing Sheets

DETERMINING WELLBORE POSITION WITHIN SUBSURFACE EARTH STRUCTURES AND UPDATING MODELS OF SUCH STRUCTURES USING AZIMUTHAL FORMATION MEASUREMENTS

BACKGROUND OF THE INVENTION

1. Field of the Invention

The invention relates generally to the field of determining position of a wellbore within subsurface Earth formations. More specifically, the invention relates to methods for using azimuthally dependent formation property measurements of such formation to more precisely locate the position of the wellbore and to refine models of the Earth's subsurface structure.

2. Background Art

Well bores are drilled through subsurface Earth formations to extract useful materials such as oil and gas that are present in certain subsurface formations. Wellbore drilling is typically performed in a manner to optimize the amount of oil and gas bearing formation that is in hydraulic communication with a wellbore. Such positioning increases the effective drainage radius of the wellbore within the producing formation.

In order to optimize such wellbore drilling, it is known in the art to produce a model of the structure of the Earth's subsurface formations. Such models may be initially generated using techniques that do not use data from within the subsurface formations, such as seismic surveying and electromagnetic surveying. Such surveys are interpreted to produce an initial estimate or model of the spatial distribution of the subsurface formations, including those that may contain oil and/or gas.

As one or more wellbores are drilled through the formations that have been modeled using the above seismic and/or electromagnetic surveying techniques, the model may be adjusted or updated to reflect information obtained during or after the drilling of such wellbore(s). Such information is generally obtained in the form of "well logs," such well logs being a record with respect to position along the wellbore of various physical parameters. Such parameters may include, for example, electrical conductivity (resistivity), acoustic velocity, density, neutron porosity and natural gamma radiation and formation fluid pressure among others. Such well logs may be made during the drilling of the wellbore, using so called "logging while drilling" (LWD) measurements, or afterward, using well logging instruments conveyed along the wellbore using armored electrical cable or other known conveyance technique. A model may also be initially generated based on well logs alone.

In order to adjust or update the initial model of the Earth's subsurface structure in a useful manner based on such well log data, it is necessary to know with reasonable precision the geodetic position of the wellbore at every point along its length, and the precise position along the wellbore of the particular well logging instrument whose measurements are used to adjust the model. The position along the wellbore is referred to as the "measured depth" and may be reasonably precisely determined using techniques well known in the art.

Determining the geodetic position of the wellbore at any point along its length is typically performed using directional sensors disposed in the well logging instrument. Such directional sensors may include magnetometers to determine wellbore direction with respect to the Earth's magnetic poles and accelerometers to determined the inclination of the wellbore from vertical (gravity). It is also known in the art to use inertial navigation devices to determine geodetic direction of the wellbore. Irrespective of the type of directional measurement instrument being used, limits on their accuracy and precision result in some degree of uncertainty as to the absolute geodetic position of the wellbore. There are corresponding limits to the accuracy and precision of the initial models made from seismic and/or electromagnetic surveys. As a result, in some wellbore drilling operations, wherein it is desirable to maintain the wellbore trajectory within a particular formation within the Earth's subsurface, the degree of uncertainty as to the relative positions of the wellbore and the subsurface formations may limit the ability of the wellbore operator to so maintain the wellbore trajectory.

More recently, apparatus and methods have been developed that provide formation property measurements that are directionally (azimuthally) sensitive, and can provide estimates of the distance from the well logging instrument to one or more formation boundaries (wherein a mineral composition and/or fluid content of the formation changes). See, for example, U.S. patent application Publication No. 2005/0140373 filed by Li et al. and assigned to the assignee of the present invention.

There continues to be a need to more precisely determine the position of a wellbore within structures in the Earth's subsurface and to be able to navigate wellbores during drilling to maintain such position along a desired trajectory with respect to subsurface formations.

SUMMARY OF THE INVENTION

One aspect of the invention is a method for determining structure in the Earth's subsurface. A method according to this aspect of the invention includes generating an initial model of the structure. The initial model includes at least one layer boundary. A wellbore is drilled along a selected trajectory through the Earth's subsurface in a volume represented by the initial model. At least one formation parameter is measured azimuthally along the wellbore. A distance from the wellbore is determined at selected positions therealong to the at least one layer boundary using the azimuthal parameter measurements. The initial model is adjusted using the determined distances.

A system for modeling a subsurface structure of the Earth according to another aspect of the invention includes an instrument for measuring a formation parameter azimuthally along a wellbore drilled through a volume of the Earth's subsurface represented by an initial model. A processor is in signal communication with the instrument. The processor is configured to determine a distance from the wellbore to at least one formation boundary in the volume from azimuthal measurements made by the instrument. The processor is configured to adjust the initial model using the determined distance.

Other aspects and advantages of the invention will be apparent from the following description and the appended claims.

DETAILED DESCRIPTION

Methods and systems according to the various aspects of the invention include making measurements along a wellbore of at least one formation parameter using an instrument that is azimuthally sensitive. The azimuthally sensitive formation parameter measurements are made both along the wellbore and in a plurality of azimuthal directions around the wellbore such that a distance can be determined from the wellbore (or the instrument) to a formation boundary. Two specific examples of azimuthal parameter measurements that can be useful to determine distance to a formation boundary described in more detail below are resistivity of the formation and acoustic travel time. As a matter of principle, the particular formation parameter being measured only needs to have contrast at formation layer boundaries, and be measurable at a sufficient lateral distance from the wellbore to as to be able to effectively determine the position of the wellbore with respect to such layer boundaries without having the wellbore penetrate such boundaries. Examples in this description that include a specific parameter, such as resistivity, should not be considered limiting.

An apparatus and techniques for measuring formation resistivity as described in U.S. patent application Publication No. 2005/0140373 filed by Li et al., may be used in some examples of implementing a method and system according to the present invention. The apparatus and technique described in the '373 publication are in part described below with reference to FIGS. 1-3B in order to explain one example of how to determine position of a wellbore with respect to subsurface formation boundaries. In some examples, such determination may be used to more precisely define the wellbore trajectory within the Earth's subsurface structure than may be possible using directional measurements alone. In some examples, such determination may be used to update or refine a model of the structure of the Earth's subsurface.

Figure 1:
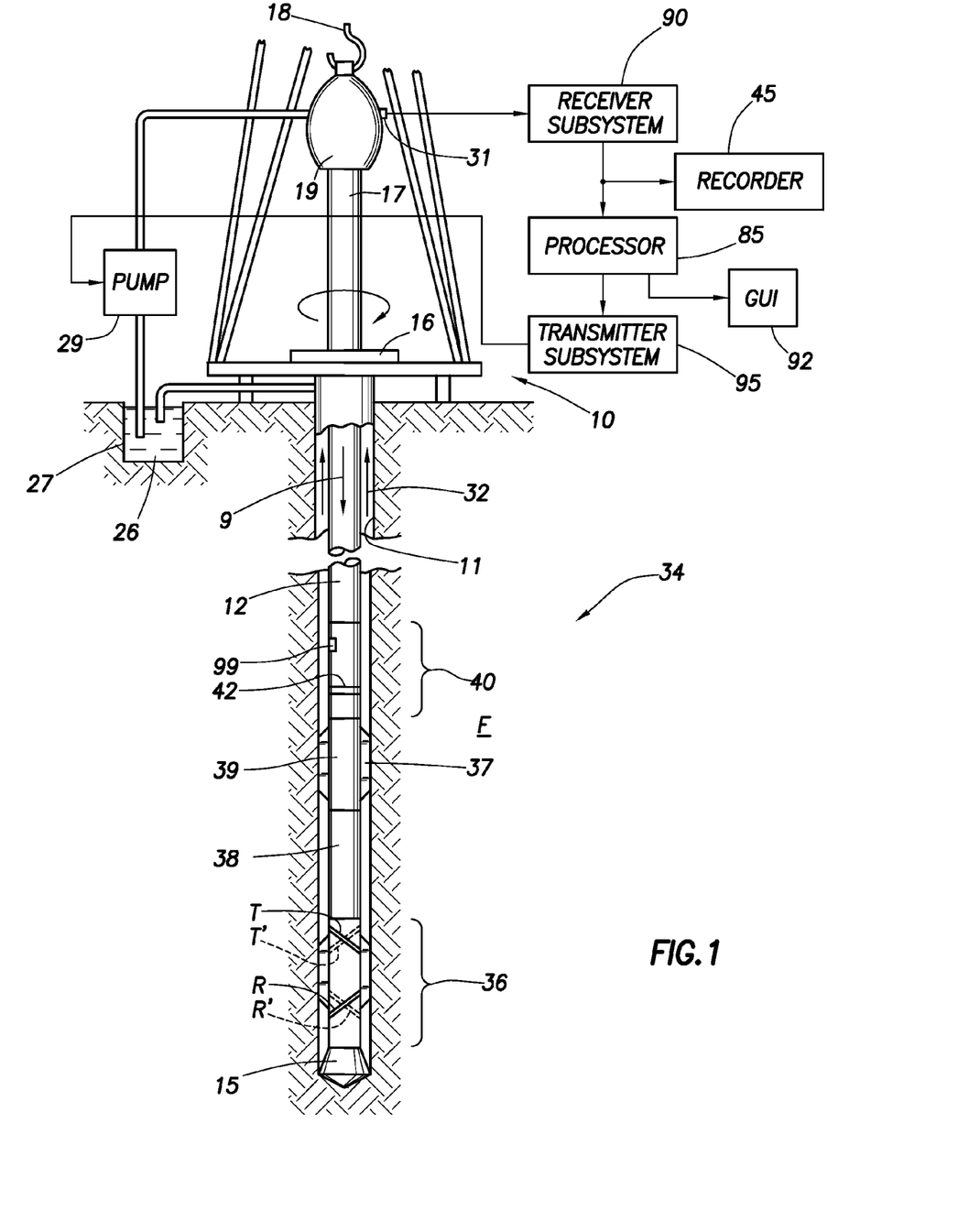
FIG. 1 is an elevational view of a conventional rotary drilling string in which the present invention may be used.

FIG. 1 illustrates a conventional drilling rig and drill string. A land-based platform and derrick assembly 10 are positioned over a wellbore 11 penetrating a subsurface Earth formation F. In the illustrated embodiment, the wellbore 11 is formed by rotary drilling in a manner that is well known. It will be readily appreciated by those skilled in the art, however, that the present invention also finds application in directional drilling applications as well as rotary drilling, and is not limited to land-based rigs.

A drill string 12 is suspended within the wellbore 11 and includes a drill bit 15 at its lower end. The drill string 12 is rotated by a rotary table 16, energized by means not shown, which engages a kelly 17 at the upper end of the drill string. The drill string 12 is suspended from a hook 18, attached to a traveling block (also not shown), through the kelly 17 and a rotary swivel 19 which permits rotation of the drill string relative to the hook. Drilling fluid ("mud") 26 is stored in a tank or pit 27 formed at the well site. A pump 29 moves the drilling fluid 26 to the interior of the drill string 12 via a port in the swivel 19, inducing the drilling fluid to flow downwardly through the drill string 12 as indicated by arrow 9. The drilling fluid exits the drill string 12 via ports in the drill bit 15, and then circulates upwardly through the annular space between the outside of the drill string and the wall of the wellbore, as indicated by arrows 32. In this manner, the drilling fluid cools and lubricates the drill bit 15 and carries formation cuttings up to the surface as it is returned to the pit 27 for recirculation. It will be appreciated by those skilled in the art that the drill string 12 may alternatively be rotated by a top drive (not shown) or similar rig-suspended device. The lower portion of the drill fluid 26 and coupled within the drill string 12. Such motors are known in the art as "mud motors." Accordingly, the device used to rotate the drill string shown in FIG. 1 is not intended to limit the scope of the invention.

The drill string 12 further includes a bottom hole assembly, generally shown at 34, near the drill bit 15 (in other words, within several drill collar length from the drill bit). The bottom hole assembly 34 includes instruments for measuring, processing, and storing measurement information, as well as communicating with equipment at the Earth's surface. The bottom hole assembly 34 may include, among other things, a measuring apparatus 36 for determining and communicating the resistivity of the formation F surrounding the wellbore 11. The measuring apparatus 36, also known as a resistively tool, includes a first pair of transmitting/receiving antennas T, R, as well as a second pair of transmitting/receiving antennas T", R'. The second pair of antennas T', R' are symmetric with respect to the first pair of antennas T, R, as is described in greater detail below. The measuring apparatus 36 further includes a controller to control the acquisition of data, as is known in the art.

The bottom hole assembly ("BHA") 34 in the present example can further include instruments housed within drill collars 38, 39 for performing various other measurement functions, such as measurement of the natural gamma ray radiation, density (gamma ray or neutron), neutron capture cross section, transverse and/or longitudinal nuclear magnetic relaxation properties and fluid pressure in the pore spaces of the formation F. Some devices for measuring fluid pressure may make time indexed measurements such that inferences of permeability of the formation F may be made. At least some of the drill collars may include stabilizers 37, as is well known in the art.

A surface/local communications subassembly 40 is also included in the BHA 34, just above the drill collar 39. The subassembly 40 includes a toroidal antenna 42 used for local communication with the measuring apparatus 36 (although other known local-communication means may be used), and a known type of acoustic telemetry system that communicates with a similar system (not shown) at the Earth's surface via signals induced in the drilling fluid or mud by modulating the flow thereof. Thus, the telemetry system in the drilling fluid ("mud pulse") that is representative of measured downhole parameters. The local communication subassembly 40 may also include an electric and/or optical fiber telemetry device to transmit signals at relatively high bandwidth over a so-called "wired" drill pipe. Such pipe includes at least one insulated electrical conductor and/or optical fiber along the entire length of the drill string 12 such that signals may be transmitted to the Earth's surface thereover. See, e.g., U.S. Pat. No. 7,017,667 issued to Hall et al. and incorporated herein by reference.

The generated acoustical signal in the drilling fluid is received at the surface by transducers represented by reference numeral 31. The transducers 31, for example, piezoelectric transducers, convert the received acoustical signals to electronic signals. The output of the transducers 31 is coupled to an uphole receiving subsystem 90, which demodulates the transmitted signals. The output of the receiving subsystem 90 is then coupled to a computer processor 85 and a recorder 45. The processor 85 may be used to determine the formation resistivity profile (among other things) on a "real time" basis while the wellbore is being drilled or "tripped" (moving the drill string into and/or out of the wellbore) or subsequently by accessing recorded data from a recorder 45 associated with the subassembly 40. The computer processor 85 may be coupled to a monitor 92 that employs a graphical user interface ("GUI") through which the measured downhole parameters and particular results derived therefrom (e.g., resistivity profiles) are graphically presented to a user. Alternatively, if the signals are transmitted over electrical and/or optical conductors, as described above, electrical and/or optical coupling may be made to the receiving subsystem 90 for decoding such signals.

An uphole transmitting system 95 is also provided for receiving commands input by the user (e.g., using the GUI in the monitor 92), and may be configured to selectively interrupt the operation of the pump 29 in a manner that is detectable by transducer 99 in the subassembly 40. In this manner, there is two-way communication between the subassembly 40 and the uphole equipment. A suitable subassembly 40 is described in greater detail in U.S. Pat. Nos. 5,235,285 and 5,517,464, both of which are assigned to the assignee of the present invention. Those skilled in the art will appreciate that alternative acoustic techniques, as well as other telemetry means (e.g., electromechanical, electromagnetic), can be used for communication between the subassembly 40 and the Earth's surface. As was explained above with respect to electrical and/or optical telemetry, commands may also be sent from the processor 85 to the local subassembly 40 in the wellbore using such electrical and/or optical telemetry.

In the present example, two types of coil antennas can be used to make resistivity measurements with directional (azimuthal) sensitivity. One type provides directional sensitivity by having the antenna either offset, e.g., from the center of a logging instrument's longitudinal axis, or partially covered. Directional measurement can also be made with an antenna configured so that its, magnetic moment is not aligned with the longitudinal axis of the instrument. The present example may use the latter type of directionally-sensitive antenna.

Figure 2:
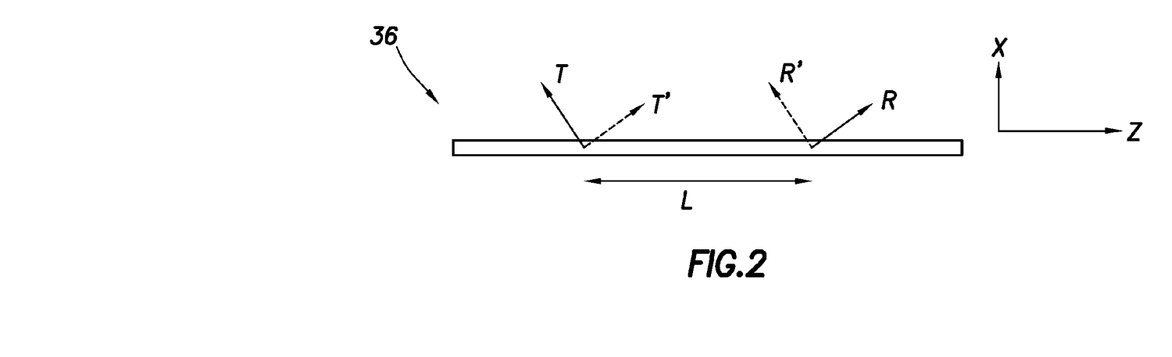
FIG. 2 is a schematic representation of a basic directional measurement logging tool having symmetrical transmitter and receiver antenna pairs.

FIG. 2 schematically illustrates a basic resistivity tool 36 for directional electromagnetic (EM) wave measurement. The tool 36 includes a transmitter antenna T that induces an EM wave of a selected frequency f and a receiver antenna R that is a selected distance L away from the transmitter antenna T. Also shown is the symmetric pair (T', R') described above with reference to FIG. 1 and which may be in accordance with the description in U.S. patent application Publication No. 20003/0085707 filed by Minerbo et al. and assigned to the assignee of the present invention. For clarity and simplification, the description that follows will be limited to the transmitter antenna T and the receiver antenna R, although it is generally applicable to the symmetric antenna pair, T' and R'. It should be noted that although the moment of the two symmetrical antenna pairs are on the same plane in FIG. 2, this is not required. As will be clear in the subsequent description, signals from two pairs that have their moment in different planes can still be added together to achieve equivalent results if the extracted coefficients or directional phase-shift or attenuation are used in a symmetrization operation.

In operation, the receiver antenna R will have a voltage $V_{RT}$ induced therein by the EM wave from the transmitter antenna T and its secondary currents produced in the formation penetrated by the borehole containing the logging tool 36. Both antennas T and R are fixed on the tool 36 and thus rotate with the tool 36. The antenna orientations may be described as angles $\theta_T$ for the transmitter antenna T, and $\theta_R$ for the receiver antenna R. The azimuthal variation of the induced voltage in the receiver R as the tool 36 rotates can then be expressed in terms of the coupling of Cartesian components of the magnetic dipoles.

One particular aspect of the measurements of phase-shift and attenuation is that they are suited for "while drilling" measurements, for which detailed characterization of thermal electronics drift under downhole conditions a difficult to perform. The directional phase-shift and attenuation measurements defined herein have the benefit of a traditional borehole-compensated propagation resistivity tool, namely that the transmitter and receiver antenna characteristic and the drift of the receiver electronics are all canceled out of the measurement.

The above analyses can be extended straightforwardly to the traditional TRR type of measurements, as described in the Minerbo et al. publication referred to above. One skilled in the art can easily show that this procedure produces essentially the same response as indicated above, but with twice the signal when the spacing between the receiver pair is much smaller comparing with the TR spacing. The directional signals from the two receivers simply add.

Figure 3A:
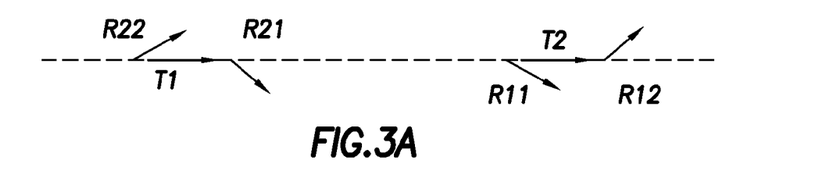
FIG. 3A is a schematic representation of an example directional measurement logging tool having a TRR configuration that is insensitive to anisotropy at any dip angle.
Figure 3B:
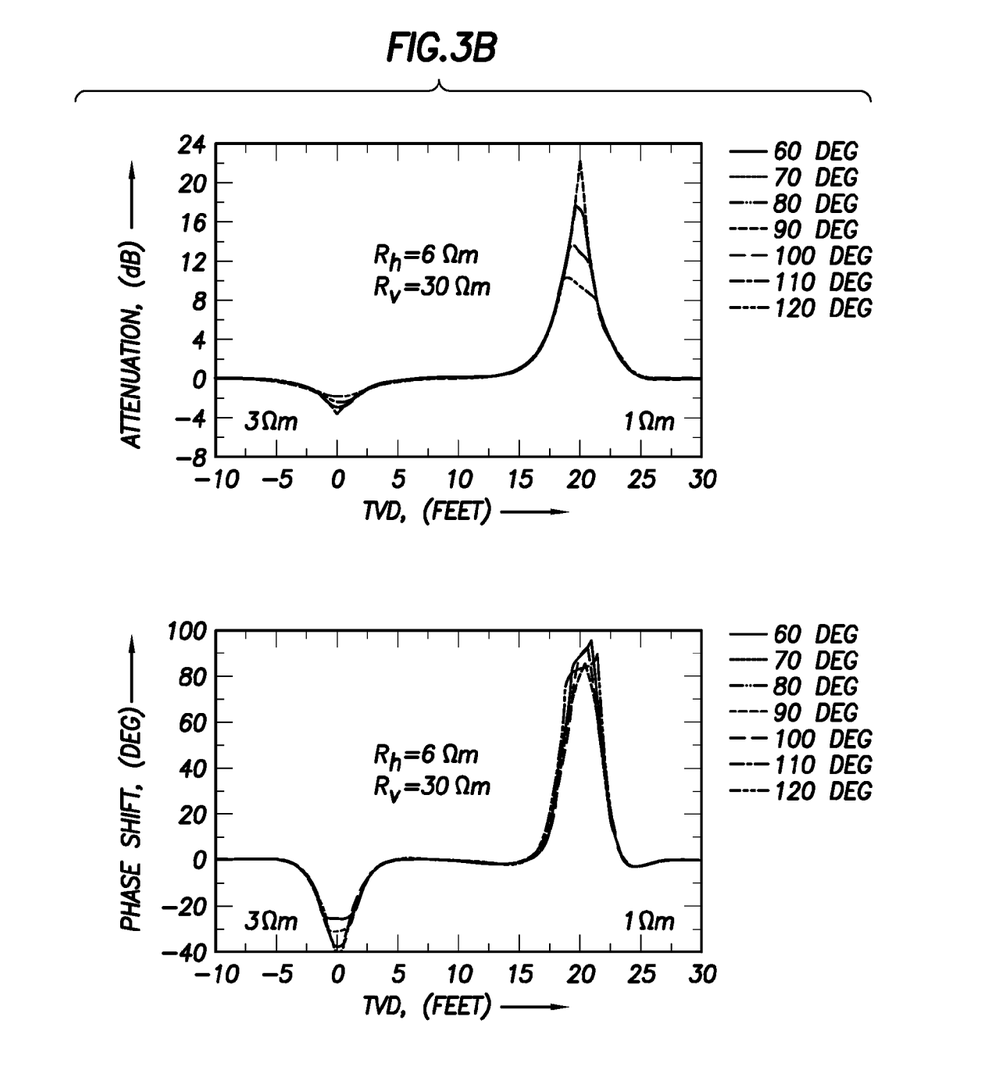
FIG. 3B shows plots of the directional propagation response for a three-layer formation using a logging tool according to FIG. 3A.

FIG. 3A shows a TRR configuration that is insensitive to anisotropy (change in apparent resistivity of a formation with respect to the direction of measurement) at any dip angle, and FIG. 3B shows responses according to this configuration. Transmitter antenna T1 is energized and the phase shift and attenuation from the receiver antennas R11, R12 is measured. Then, transmitter antenna T2 is energized and the phase shift and attenuation from the receiver antennas R21, R22 is measured. The tool reading corresponds to the differences between these two sets of measurements. Since the individual measurements are identical in a homogeneous medium at any angle and with any anisotropy, the tool readings are zero in a homogenous medium at any dip.

The measurement responses in a three-layer anisotropic formation are shown in FIG. 3B. The tool reading is zero far from the boundary at any dip, and there is little sensitivity to anisotropy close to the boundary. Separation in responses results from the fact that EM propagation responses are not completely symmetric if the transmitter and receiver location are interchanged. It should be observed that attenuation responses are practically overlapping for different dip if all antennas are in the same medium. The phase shift measurements are also overlapping, although responses are double-valued in the conductive bed (1 S/m). The manner in which distances to layer boundaries in the Earth's subsurface from the azimuthally sensitive resistivity measurements is well described in the '373 publication and need not be presented herein in any more detail.

The above description is intended to provide an example of how distances to boundaries of subsurface Earth formations from a well logging instrument may be determined. Such determined distances are used in some examples to adjust and/or update a model of the structure of the Earth's subsurface.

Figure 4:
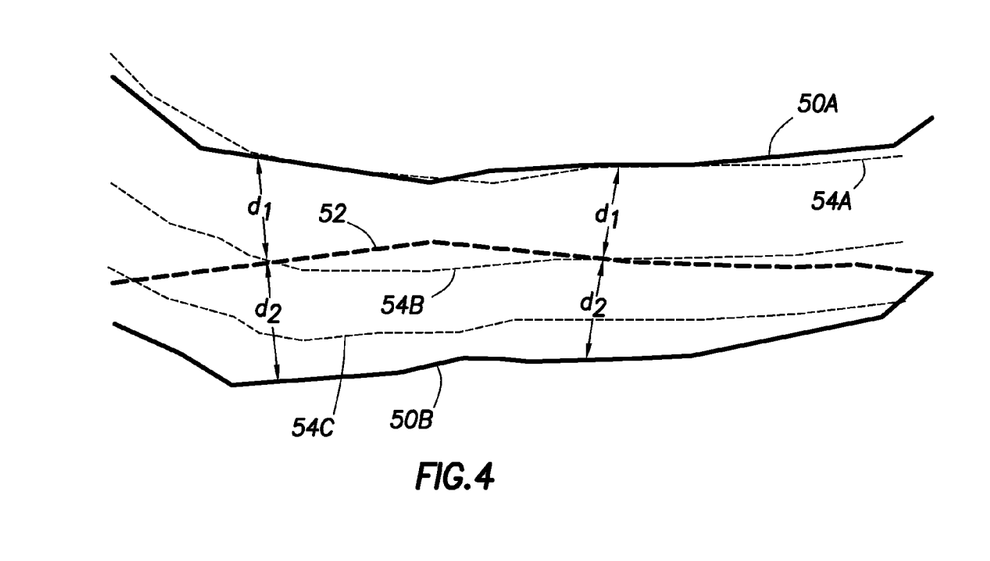
FIG. 4 shows a cross section of a well path superimposed on an initial model and an updated model based on azimuthally sensitive resistivity measurements.

FIG. 4 is an expanded scale view of a plane section of an in initial model and an updated model to illustrate the principle of a method according to the invention. An initial model of the Earth's subsurface structure may be generated that includes the spatial distribution (shown in 2 dimensions in FIG. 4) of various mineral compositions of Earth formations, and of petrophysical properties of such Earth formations, such as their fractional volume of pore space (porosity), the fluid content in such pore spaces (water saturation), fluid pressure in the pore spaces, and estimates of permeability, among other properties. Alternatively, such models may be of spatial distribution of petrophysical measurement parameters, such as resistivity and natural gamma radiation. The parameters used in the initial model are not intended to limit the scope of the invention.

Such subsurface models may be initially generated using, for example, seismic and/or electromagnetic survey information, as explained above, among other techniques, where no subsurface information is available. The initial model may from time to time be updated or refined to reflect data obtained from one or more wellbores drilled through the Earth's subsurface within the volume represented by the initial model. Such updating, as is known in the art, may include well log data such as resistivity, acoustic velocity, neutron porosity, natural gamma radiation, density and fluid pressures, among other data. The data used to refine or update the model may also include actual samples of the subsurface Earth formations (cores). So-called "checkshot" surveys may also be obtained from within each wellbores in order to measure seismic travel time from the surface to selected depths in the wellbore, so that the seismic survey data may be corrected for the effects of varying formation seismic velocity through the subsurface. If no seismic data or electromagnetic survey data are available, the initial model may be made entirely from subsurface information. It is also known in the art to construct initial models entirely from well log data and formation sample (core) data. Accordingly, the source of data used to generate the initial model is not a limit on the scope of the invention.

Because well log data are typically recorded with respect to what is inferred to be the depth in the Earth, such well log data may preferably be obtained from wellbores drilled such that any uncertainty in the actual geodetic position of the wellbore within the Earth's subsurface, resulting from limitations of accuracy and precision of wellbore directional measuring instruments, will have relatively little effect on the model. Such wellbores are those in which the wellbore intersects the various subsurface formations relatively close to perpendicularly to the attitude of the formation. In formations that are relatively horizontally disposed, therefore, such wells would be substantially vertical. It is to be clearly understood that the invention is not limited in scope to using well log data obtained from wellbores drilled perpendicularly through the subsurface formations. As a practical matter, however, the invention may have particular application in the placement of wellbores drilled substantially parallel to the attitude of one or more subsurface formations, or in using data obtained from such wellbores in update models of the Earth's subsurface over a wide geodetic area. As will be appreciated by those skilled in the art, to a large extent, subsurface formations of interest to producers of oil and gas are largely modeled as substantially horizontally disposed layers of rock, wherein wellbores drilled parallel to the layering thereof are substantially horizontally disposed.

An important aspect of such subsurface models, whether updated by well log data or not, is an expected spatial distribution of one or more formations that are intended to be penetrated by a wellbore in a direction essentially parallel to their attitudes. Those skilled in the art will appreciate that one example of such spatial distribution is a subsurface hydrocarbon reservoir formation. Such reservoir may have an oil/water contact therein. An objective of drilling a wellbore through such reservoirs may be to maintain the well path to the greater extent possible within an oil layer disposed above the oil/water contact. In FIG. 4, an initial model (which may be updated by well log data as explained above) may include a spatial distribution of a reservoir upper limit 54A. Such upper limit may represent the boundary between the reservoir bearing formation and an overlying "cap rock" (not shown) consisting of relatively impermeable formation(s). Spatial distribution of a lower limit of the reservoir from the initial model is shown at 54C. A fluid contact is shown at 54B. Such fluid contact 54B may be an oil/water contact, a gas/oil contact, or a gas/water contact, for example. A wellbore trajectory through the subsurface formations projected onto the initial model is shown in FIG. 4 at 52.

During or after drilling of the wellbore, azimuthal resistivity measurements may be made as explained above with reference to FIGS. 1-3B, and at selected positions along the wellbore, a distance to an upper formation boundary, shown at $d_1$, and a distance to a lower formation boundary, shown at $d_2$, may be determined as explained above using such azimuthal resistivity measurements. Using the determined distances, $d_1$, $d_2$, an updated or adjusted position of the upper limit and lower limit may be determined, as shown generally at 50A for the upper limit and at 50B for the lower limit. The updated positions of the upper 50A and lower 50B limits may then be used to updated the initial model of the Earth's subsurface.

Figure 5:
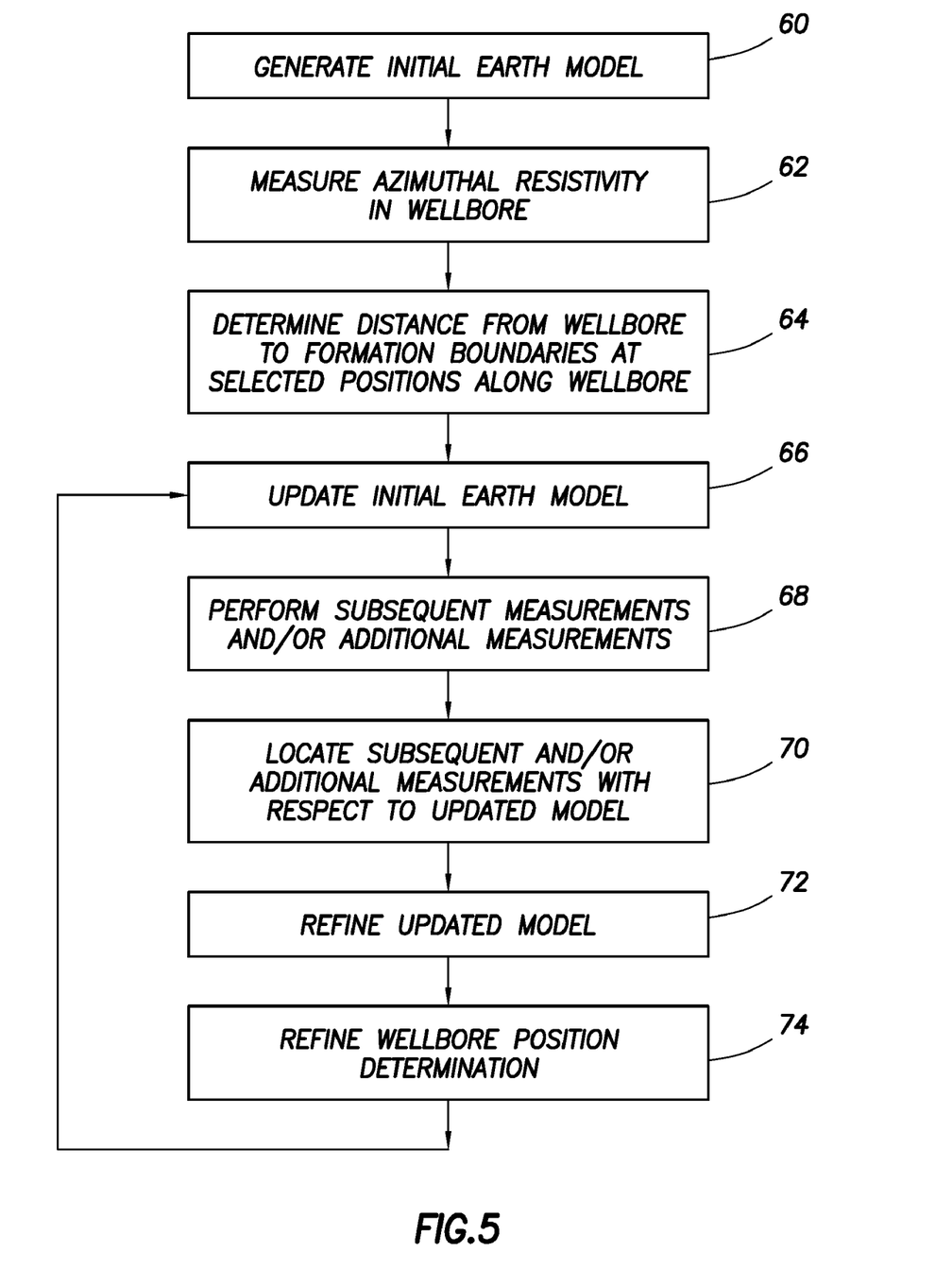
FIG. 5 is a flow chart of one example of a method for determining structure in the Earth's subsurface.

An example method according to the invention will now be explained with reference to the flow chart in FIG. 5. At 60, an initial model of the Earth's subsurface is generated. Such initial model, as explained above, may be made using seismic and/or electromagnetic surveying, and may be updated or refined using well log data and/or formation sample data if such data are available. At 62, in a wellbore drilled at high incident angle to the attitude of formations of interest, azimuthally sensitive measurements of a formations parameter such as resistivity, are made. Such measurements may be made during drilling the wellbore or thereafter. At 64, using such measurements, at various positions along the wellbore, a distance may be determined from the wellbore to one or more formation boundaries. Such boundaries may include fluid contacts and/or formation composition changes, as explained above.

The distances determined at 64 may be used, at 66, to update or refine the initial model. The initial model may be adjusted to reflect the above determined distances from the wellbore.

At 68, other well log measurements may be made, either contemporaneously with the azimuthally sensitive resistivity measurements or afterward. Because the position of the wellbore with respect to the formation boundaries will be better determined as a result of performing the distance determination at 64, such other well log measurements will more precisely associated, as shown at 70, with particular subsurface formations estimated from the initial model. At 72, the updated model determined at 66 may be refined using the additional or subsequent well log data. The initial model, updated or adjusted models and any other well log or other data may be stored in the processor (85 in FIG. 1) and/or displayed using the GUI monitor (92 in FIG. 1).

In some examples, the determined geodetic position of the wellbore along its trajectory may be refined, at 74, and the refined position information may be used in conjunction with the boundary distance determination at 64 to update the model of the Earth's subsurface. As explained above, the wellbore trajectory (position at each point along its length) may be determined during drilling using directional sensor disposed in one or more of the components of the drill string. During drilling or afterward, the measurements made by the directional sensors may be supplemented by such data as checkshot survey determined seismic travel time. Checkshot surveys may be performed during drilling or afterward. See, for example, U.S. Pat. No. 5,555,220 issued to Minto and U.S. patent application Publication No. 2005/0041526 filed by Esmersoy et al. and assigned to the assignee of the present invention. A checkshot survey may enable more precise determination of the position of the wellbore with respect to a seismic section. By more precise determination of the wellbore position with respect to the seismic section, and by using the determined distances to the layer boundaries, it may be possible to refine the model with respect to the seismic section. If the seismic section suggests, for example, that there is relatively little lateral velocity variation in the Earth's subsurface within the model volume, then a seismic time to depth record made in a near-vertical wellbore within the model volume may be used to calibrate the checkshot survey with respect to depth. Thus, the model may be refined to more precisely position the layer boundaries with respect to depth in the subsurface.

As previously stated, other formation parameters may be measured azimuthally to determine the distance from the wellbore to the formation boundary. U.S. Pat. No. 7,035,165 issued to Tang, incorporated herein by reference, describes using acoustic measurements to make such distance determinations. As described in the Tang '165 patent, such measurements and determinations may be made as follows. A plurality of multicomponent acoustic measurements indicative of a formation parameter of interest (typically acoustic velocity or slowness) is obtained at a plurality of wellbore positions (depths) and for a plurality of source-receiver spacings on the logging instrument. An orientation sensor on the instrument, which can be a magnetometer, is used for obtaining an orientation measurement indicative of an orientation of the logging instrument. The multicomponent acoustic measurements are mathematically transformed (rotated) to a fixed coordinate system such as a geodetic system defined with respect to magnetic or geographic north, using the orientation measurements, giving rotated multicomponent measurements. The rotated multicomponent measurements are processed for obtaining the parameter of interest. In one example, the parameter of interest includes an azimuth and relative dip of the bed boundary. In one example, the multicomponent measurements are made with a cross-dipole acoustic sensor. In another example, the multicomponent measurements are hybrid data, i.e., obtained from either a monopole source into a cross-dipole receiver pair of a cross-dipole source into a monopole receiver.

When measurements are made at a plurality of depths, the processing can provide a migrated image of bed boundaries in the earth formation. In one example, compressional waves produced by a dipole source are used. Prior to migration, certain pre-processing may be used, such as high pass filtering, first break determination, frequency-wavenumber (f-k) filtering, dip median filtering, and, selective gating of the data in time windows. On the migrated sections, the relative dip may be obtained by fitting a line to a linear trend on one of said plurality of migrated image data sections. The azimuth is determined by an inversion of the migrated image data sections, the inversion based at least in part on minimizing a cost function over an image area of interest.

A system for modeling subsurface Earth structures may include formation parameter measuring and data processing components such as shown in and explained above with reference to FIG. 1. Such a system includes an instrument for azimuthally measuring at least one formation parameter. One example of a parameter may be resistivity, as explained above. Another example of a parameter may be acoustic velocity, also as explained above. The system may include a processor for storing an initial model of the subsurface Earth structure. The processor may be configured to process the azimuthal parameter measurements to determine distance to a formation boundary at selected positions along a wellbore. The processor may be configured to adjust the initial model using the distance measurements. The processor may be configured to adjust the model using at least one additional petrophysical parameter measurement in the wellbore. The processor may be operatively coupled to a display for producing a visible image of the initial and/or adjusted model. In one example, the system includes a so-called "wired" drill string having therein an electrical conductor and/or optical fiber that enables measurements from the azimuthal measuring instrument to be communicated to the processor substantially in real time, such that the model may be adjusted substantially in real time.

Methods and systems according to the invention may result in more precise models of spatial distribution of subsurface formations and their fluid content. More precise models may improve the drilling of subsequent wellbores to optimize drainage of subsurface reservoirs, by reducing placement of wellbores into unsuitable formations.

While the invention has been described with respect to a limited number of embodiments, those skilled in the art, having benefit of this disclosure, will appreciated that other embodiments can be devised which do not depart from the scope of the invention as disclosed herein. Accordingly, the scope of the invention should be limited only by the attached claims.

What is claimed is:

1. A method for determining structure in the Earth's subsurface, comprising:
    generating an initial model of the structure based on a well log, the initial model including at least one upper layer boundary and at least one lower layer boundary;
    drilling a wellbore along a selected trajectory through the Earth's subsurface in a volume represented by the initial model;
    azimuthally measuring at least one formation parameter along the wellbore;
    determining a distance from the wellbore at selected positions therealong to the at least one upper layer boundary and to the at least one lower layer boundary using the azimuthal formation parameter measurements independent of wellbore uncertainty and relative to the initial model; and
    adjusting the initial model using the determined distances.

2. The method of claim 1 wherein the formation parameter is resistivity.

3. The method of claim 1 wherein the formation parameter is acoustic velocity.

4. The method of claim 1 wherein the initial model is generated using at least one of seismic and electromagnetic survey data.

5. The method of claim 1 wherein the initial model is generated using well log data.

6. The method of claim 1 wherein the wellbore is drilled substantially between the at least one upper layer boundary and the at least one lower layer boundary.

7. The method of claim 1 further comprising using the determined distances for increased accuracy in 1) association between the well logs and the structure identified in the model and 2) position of the wellbore.

8. The method of claim 1 further comprising measuring at least one additional petrophysical parameter along the wellbore and refining the initial model using the at least one additional petrophysical parameter.

9. The method of claim 8 wherein the at least one petrophysical parameter comprises at least one of acoustic velocity, natural gamma radiation, neutron porosity, density, nuclear magnetization transverse relaxation time, nuclear magnetization longitudinal relaxation time, permeability and formation fluid pressure.

10. The method of claim 8 wherein the measuring at least one additional petrophysical parameter is performed during the drilling of the wellbore.

11. The method of claim 1 wherein the azimuthally measuring one or more formation parameters is performed during the drilling of the wellbore.

12. The method of claim 2 wherein the measuring resistivity is performed by propagating an electromagnetic wave at a first position along the wellbore and measuring at least one of a phase shift and an amplitude change of the wave at a second position along the wellbore.

13. The method of claim 12 wherein the propagating and measuring at least one of phase shift and amplitude change is performed using antennas having dipole moment oriented in a direction offset from a longitudinal axis of a measuring instrument and by rotating the instrument within the wellbore.

14. The method of claim 1 further comprising measuring a seismic travel time from the Earth's surface to the wellbore at least one position along the wellbore and adjusting the initial model using the seismic travel time.

15. The method of claim 14 further comprising calibrating the seismic travel time with respect to depth in the subsurface using checkshot data obtained from a substantially vertical wellbore drilled in a volume of the Earth's subsurface represented by the initial model.

16. The method of claim 1 wherein the initial model is refined using data obtained from at least one wellbore drilled through the subsurface within the volume represented by the initial model.

17. The method of claim 16 wherein the wellbore data comprise at least one of a measured petrophysical parameter and a sample of the formations.

18. The method of claim 1 wherein the azimuthally measured parameter is transmitted to the Earth's surface and the initial model is adjusted substantially in real time.

19. The method of claim 14, further comprising transmitting seismic travel time data to the surface via a wired drill pipe.

20. The method of claim 18, wherein the azimuthally measured parameter is transmitted to the Earth's surface via a wired drill pipe.

* * * * *